United States Patent
Song et al.

(10) Patent No.: US 9,680,392 B2
(45) Date of Patent: Jun. 13, 2017

(54) MODULAR MULTI-LEVEL CONVERTER

(71) Applicant: LSIS CO., LTD., Anyang-si, Gyeonggi-do (KR)

(72) Inventors: Woong Hyub Song, Seoul (KR); Young Woo Kim, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 24 days.

(21) Appl. No.: 14/696,137

(22) Filed: Apr. 24, 2015

(65) Prior Publication Data
US 2015/0333654 A1    Nov. 19, 2015

(30) Foreign Application Priority Data
May 13, 2014   (KR) .......................... 10-2014-0057356

(51) Int. Cl.
  *H02M 7/5387* (2007.01)
  *H02M 7/217* (2006.01)
  *H02M 5/458* (2006.01)
  *H02M 7/49* (2007.01)
  *H02M 7/483* (2007.01)

(52) U.S. Cl.
  CPC ........... *H02M 7/217* (2013.01); *H02M 5/458* (2013.01); *H02M 7/49* (2013.01); *H02M 2007/4835* (2013.01)

(58) Field of Classification Search
  CPC .. H02M 5/4585; H02M 7/1216; H02M 7/749; H02M 1/12; H02M 7/5395; H02M 1/32; H02J 1/102; H02J 7/35
  USPC .......... 363/21.04, 37, 68, 71, 132, 127, 123; 307/9.1, 10.1; 318/400.26, 805, 811
  See application file for complete search history.

(56) References Cited

U.S. PATENT DOCUMENTS 3,867,643 A     2/1975   Baker et al.
4,062,057 A  *  12/1977  Perkins ............... H02M 3/3378
                                                307/82
(Continued)

FOREIGN PATENT DOCUMENTS

EP      2458726      5/2012
JP      50-107422    8/1975
(Continued)

OTHER PUBLICATIONS

Hong, et al., "Switching-Level Operation Analysis of MMC-based Back-to-Back Converter for HVDC Application," The Transactions of the Korean Institute of Electrical Engineers vol. 62, No. 9, Sep. 2013, pp. 1240-1248.
(Continued)

*Primary Examiner* — Rajnikant Patel
(74) *Attorney, Agent, or Firm* — Lee, Hong, Degerman, Kang & Waimey PC

(57) ABSTRACT

Provided is a modular multi-level converter (MMC) including a plurality of sub-modules including switching elements, and a central control unit which assigns an address to each of the plurality of sub-modules for distinguishing each of the plurality of sub-modules, determines switching operation conditions of the plurality of sub-modules based on the assigned addresses, and outputs switching signals corresponding to the determined switching operation conditions. The central control unit determines a switching sequence of the plurality of the sub-modules according to the sequence of the assigned addresses.

4 Claims, 15 Drawing Sheets

(56) References Cited

U.S. PATENT DOCUMENTS

| | | | |
|---|---|---|---|
| 7,701,740 B2* | 4/2010 | Yamanaka | H02M 5/293 363/149 |
| 8,345,457 B2* | 1/2013 | Asplund | H02J 3/36 363/125 |
| 8,631,483 B2* | 1/2014 | Soni | H04L 63/0263 370/389 |
| 8,817,503 B2* | 8/2014 | Inoue | H02M 1/08 363/127 |
| 2002/0110155 A1 | 8/2002 | Pearce et al. | |
| 2008/0143188 A1* | 6/2008 | Adest | H02J 1/102 307/82 |
| 2012/0195084 A1 | 8/2012 | Norrga | |
| 2013/0223115 A1 | 8/2013 | Tsuchiya et al. | |
| 2014/0036557 A1 | 2/2014 | Nondahl et al. | |

FOREIGN PATENT DOCUMENTS

| | | |
|---|---|---|
| JP | 2006-320103 | 11/2006 |
| JP | 2008-161003 | 7/2008 |
| JP | 2012-147559 | 8/2012 |
| JP | 2013-507100 | 2/2013 |
| JP | 2013-46445 | 3/2013 |
| JP | 2014-82809 | 5/2014 |
| KR | 10-1998-0080611 | 11/1998 |
| KR | 10-2010-0094561 | 8/2010 |
| KR | 10-1088698 | 12/2011 |

OTHER PUBLICATIONS

Korean Intellectual Property Office Application Serial No. 10-2014-0057356, Office Action dated Sep. 1, 2015, 4 pages.

European Patent Office Application Serial No. 15165599.0, Search Report dated Oct. 7, 2015, 10 pages.

Park, et al., "A Simple and Reliable PWM Synchronization & Phase-Shift Method for Cascaded H-Bridge Multilevel Inverters based on a Standard Serial Communication Protocol," The 2006 IEEE Industry Applications Conference Forty-First IAS Annual Meeting, XP031026148, Oct. 2006, pp. 988-994.

Toit, et al., "A Distributed Control Strategy for Multi-cell Converters," APEC 200116th Annual IEEE Applied Power Electronics Conference and Exposition, XP001049718, pp. 88-93.

Angulo, et al., "Level-Shifted PWM for Cascaded Multilevel Inverters with Even Power Distribution," Power Electronics Specialists Conferece, PESC 2007, IEEE, XP031218637, Jun. 2007, pp. 2373-2378.

Japan Patent Office Application Serial No. 2015-097945, Office Action dated Jan. 26, 2016, 3 pages.

Korean Intellectual Property Office Application Serial No. 10-2014-0057356, Office Action dated Mar. 1, 2016, 4 pages.

\* cited by examiner

MODULAR MULTI-LEVEL CONVERTER

CROSS-REFERENCE TO RELATED APPLICATIONS

Pursuant to 35 U.S.C. §119(a), this application claims the benefit of earlier filing date and right of priority to Korean Patent Application No. 10-2014-0057356, filed on May 13, 2014, the contents of which are hereby incorporated by reference herein in its entirety.

BACKGROUND

The present disclosure relates to a modular multi-level converter, and more particularly to, a modular multi-level converter capable of effectively controlling a plurality of sub-modules.

High voltage direct current (HVDC) transmission refers to an electric power transmission method in which alternating current (AC) power generated from a power plant is converted into direct current (DC) power and transmitted by a transmission substation, after which the transmitted DC power is converted into AC power again at a receiving substation to supply the power.

HVDC systems are applied to undersea cable transmission, high-capacity long distance transmission, interconnections between AC systems, and the like. Also, HVDC systems make possible interconnections between different frequency system and asynchronous interconnections.

A transmission substation converts AC power into DC power. That is, since the transmission of AC power by using an undersea cable or the like presents a very dangerous situation, the transmission substation converts AC power into DC power to transmit to the receiving substation.

Meanwhile, there are various types of voltage-type converters used in HVDC systems, and modular multi-level voltage-type converters have recently attracted the most interest.

A modular multi-level converter (MMC) is an apparatus which converts DC power into AC power by using a plurality of sub-modules, and operates such that each of the sub-modules are controlled to be in states of charge, discharge, or bypass.

Accordingly, in an MMC, it is most important to control the plurality of sub-modules in the power converting operation, and the control operation of the plurality of sub-modules determines the form and quality of output AC power.

Thus, an MMC capable of efficiently controlling the plurality of sub-modules of the MMC is required.

SUMMARY

Embodiments provide a modular multi-level converter (MMC) capable of efficiently controlling a plurality of sub-modules included in the MMC.

Embodiments also provide an MMC capable of efficiently determining the switching sequence of the plurality of sub-modules included in the MMC.

Embodiments also provide an MMC capable of maintaining the balance of the switching frequency of the plurality of sub-modules included in the MMC.

The objects of the embodiments are not limited to the aforesaid, but other objects not described herein will be clearly understood by those skilled in the art from descriptions below.

In one embodiment, a modular multi-level converter (MMC) includes: a plurality of sub-modules including switching elements; and a central control unit which assigns an address to each of the plurality of sub-modules for distinguishing each of the plurality of sub-modules, determines switching operation conditions of the plurality of sub-modules based on the assigned addresses, and outputs switching signals corresponding to the determined switching operation conditions, wherein the central control unit determines a switching sequence of the plurality of the sub-modules according to a sequence of the assigned addresses.

The central control unit may sequentially assign the addresses from the front according to an arranged sequence of the plurality of sub-modules.

The switching operation conditions may include a charging operation condition, a discharging operation condition, and a bypassing operation condition, and the central control unit may allow the discharging operations to be performed sequentially from the sub-module having a lowest address, based on a target voltage and charged voltages of the plurality of sub-modules.

A sum of the voltages charged in sub-modules performing the discharging operations may correspond to the target voltage, and the central control unit may confirm the charged voltages from the sub-module having the lowest address and determine a switching operation condition of each of the sub-modules to generate an output voltage corresponding to the target voltage.

When sub-modules operating under the discharging operation condition are determined, the central control unit may store information on the sub-module having the last address from among the sub-modules operating under the discharging operation condition.

The central control unit may confirm a sub-module which has the last address and has performed a discharging operation at a previous point in time, and allow a discharging operation to be sequentially performed starting from a sub-module, which has the next address of the confirmed sub-module.

The details of one or more embodiments are set forth in the accompanying drawings and the description below. Other features will be apparent from the description and drawings, and from the claims.

DETAILED DESCRIPTION OF THE EMBODIMENTS

Figure 1:
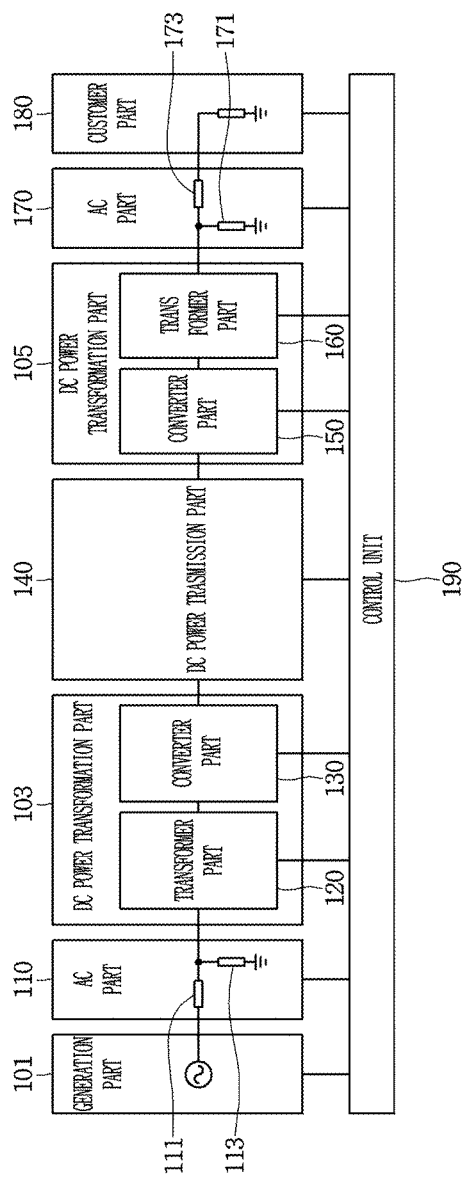
FIG. 1 is a view illustrating the configuration of a high voltage direct current (HVDC) transmission system according to an embodiment.

Advantages and features of the present invention, and implementation methods thereof will be clarified through the following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

In the following description of embodiments, a detailed description of known functions or configurations incorporated herein will not be provided when it is determined that the detailed description thereof may unnecessarily obscure the subject matter of the inventive concept. The terms which will be described below are terms defined in consideration of the functions in the present disclosure, and may be different according to users, intentions of the users, or customs. Therefore, the definitions of the terms should be determined based on the contents throughout the specification.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which are executed on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

FIG. 1 illustrates a high voltage direct current (HVDC) transmission system according to an embodiment.

As illustrated in FIG. 1, a HVDC system 100 according to an embodiment includes a power generation part 101, a transmission side alternating current (AC) part 110, a transmission side power transformation part 103, a direct current (DC) power transmission part 140, a customer side power transformation part 105, a customer side AC part 170, a customer part 180, and a control unit 190. The transmission side power transformation part 103 includes a transmission side transformer part 120, and a transmission side AC-DC converter part 130. The customer side power transformation part 105 includes a customer side DC-AC converter part 150, and a customer side transformer part 160.

The power generation part 101 generates three-phase AC power. The power generation part 101 may include a plurality of power generating plants.

The transmission side AC part 110 transmits the three-phase AC power generated by the generation part 101 to a DC power transformation substation including the transmission side transformer part 120 and the transmission side AC-DC converter part 130.

The transmission side transformer part 120 isolates the transmission side AC part 110 from the transmission side AC-DC converter part 130 and the DC power transmission part 140.

The transmission side AC-DC converter part 130 converts the three-phase AC power corresponding to the output of the transmission side transformer part 120 into DC power.

The DC power transmission part 140 transfers the transmission side DC power to the customer side.

The customer side DC-AC converter part 150 converts the DC power transferred by the DC power transmission part 140 into three-phase AC power.

The customer side transformer part 160 isolates the customer side AC part 170 from the customer side DC-AC converter part 150 and the DC power transmission part 140.

The customer side AC part 170 provides three-phase AC power corresponding to the output of the customer side transformer part 160 to the customer part 180.

The control unit 190 controls at least one of the power generation part 101, the transmission side AC part 110, the transmission side power transformation part 103, the DC power transmission part 140, the customer side power transformation part 105, the customer side AC part 170, the customer part 180, the control unit 190, the transmission side AC-DC converter part 130, and the customer side DC-AC converter part 150. Particularly, the control unit 190 may control the turn-on and turn-off timings of a plurality of valves in the transmission side AC-DC converter part 130 and the customer side DC-AC converter part 150. Here, the valves may correspond to a thyristor or an insulated gate bipolar transistor (IGBT).

Figure 2:
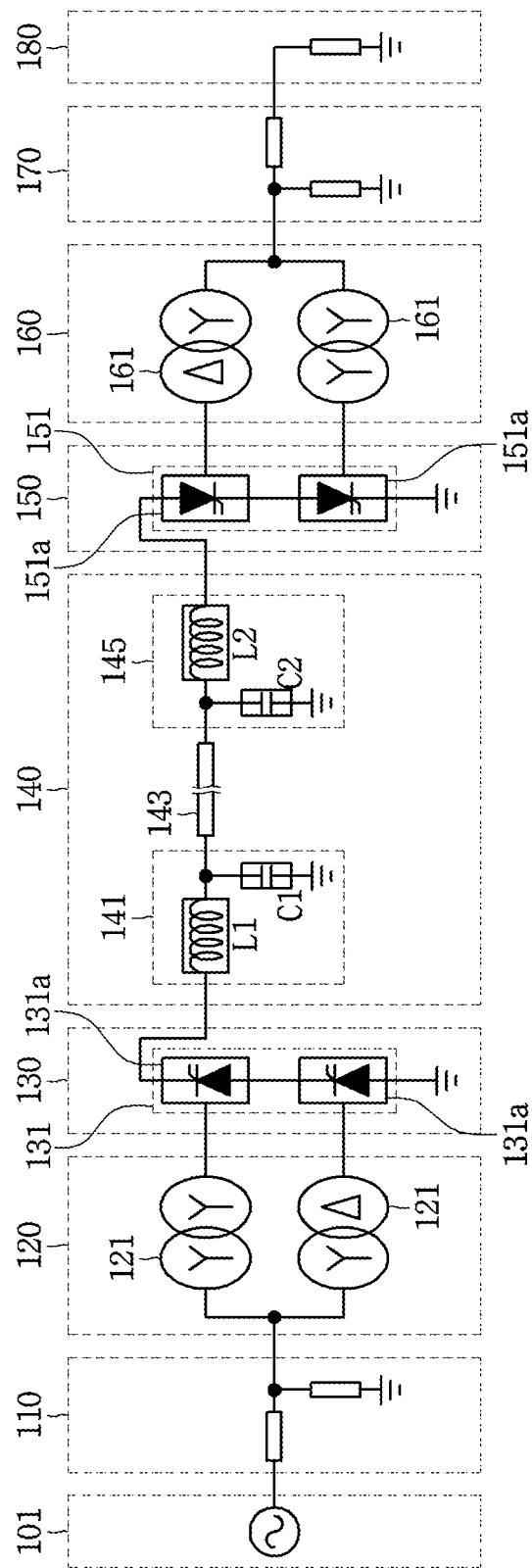
FIG. 2 is a view illustrating the configuration of a monopolar-type high voltage direct current (HVDC) transmission system according to an embodiment.

FIG. 2 illustrates a monopolar-type high voltage direct current (HVDC) transmission system.

Particularly, FIG. 2 illustrates a system which transmits DC power with a single pole. Hereinafter, the single pole is described on the assumption that it is a positive pole, but is not necessarily limited thereto.

The transmission side AC part 110 includes an AC power transmission line 111 and an AC filter 113.

The AC power transmission line 111 transfers the three-phase AC power generated by the generation part 101 to the transmission side power transformation part 103.

The AC filter 113 removes remaining frequency components other than the frequency component used by the power transformation part 103 from the transferred three-phase AC power.

The transmission side transformer part 120 includes one or more transformers 121 for the positive pole. For the positive pole, the transmission side AC-DC converter part 130 includes an AC-positive pole DC converter 131 which generates positive pole DC power, and the AC-positive pole DC converter 131 includes one or more three-phase valve bridges 131a respectively corresponding to the one or more transformers 121.

When one three-phase valve bridge 131a is used, the AC-positive pole DC converter 131 may generate positive pole DC power having six pulses by using the AC power. Here, a primary coil and a secondary coil of one of the transformers 121 may have a Y-Y connection or a Y-delta (Δ) connection.

When two three-phase valve bridges 131a are used, the AC-positive pole DC converter 131 may generate positive pole DC power having 12 pulses by using the AC power. Here, a primary coil and a secondary coil of one of the two transformers 121 may have a Y-Y connection, and a primary coil and a secondary coil of the other of the two transformers 121 may have a Y-Δ connection When three three-phase valve bridges 131a are used, the AC-positive pole DC converter 131 may generate positive pole DC power having 18 pulses by using the AC power. The more the number of the pulses of the positive pole DC power becomes, the lower the price of the filter becomes.

The DC power transmission part 140 includes a transmission side positive pole DC filter 141, a positive pole DC power transmission line 143, and a customer side positive pole DC filter 145.

The transmission side positive pole DC filter 141 includes an inductor L1 and a capacitor C1 and performs DC filtering on the positive pole DC power output by the AC-positive pole DC converter 131.

The positive pole DC power transmission line 143 has a single DC line for transmission of the positive pole DC power, and the earth may be used as a current feedback path. One or more switches may be disposed on the DC line.

The customer side positive pole DC filter 145 includes an inductor L2 and a capacitor C2 and performs DC filtering on the positive pole DC power transferred through the positive pole DC power transmission line 143.

The customer side DC-AC converter part 150 includes a positive pole DC-AC converter 151 and one or more three-phase valve bridges 151a.

The customer side transformer part 160 includes, for the positive pole, one or more transformers 161 respectively corresponding to one or more three-phase valve bridges 151a.

When one three-phase valve bridge 151a is used, the positive pole DC-AC converter 151 may generate AC power having six pulses by using the positive pole DC power. Here, a primary coil and a secondary coil of one of the transformers 161 may have a Y-Y connection or a Y-delta (Δ) connection.

When two three-phase valve bridges 151a are used, the positive pole DC-AC converter 151 may generate AC power having 12 pulses by using the positive pole DC power. Here, a primary coil and a secondary coil of one of the two transformers 161 may have a Y-Y connection, and a primary coil and a secondary coil of the other of the two transformers 161 may also have a Y-Δ connection.

When three three-phase valve bridges 151a are used, the positive pole DC-AC converter 151 may generate AC power having 18 pulses by using the positive pole DC power. The more the number of the pulses of the AC power becomes, the lower the price of the filter becomes.

The customer side AC part 170 includes an AC filter 171 and an AC power transmission line 173.

The AC filter 171 removes frequency components other than the frequency component (for example, 60 Hz) used by the customer part 180 from the AC power generated by the customer side power transformation part 105.

The AC power transmission line 173 transfers the filtered AC power to the customer part 180.

Figure 3:
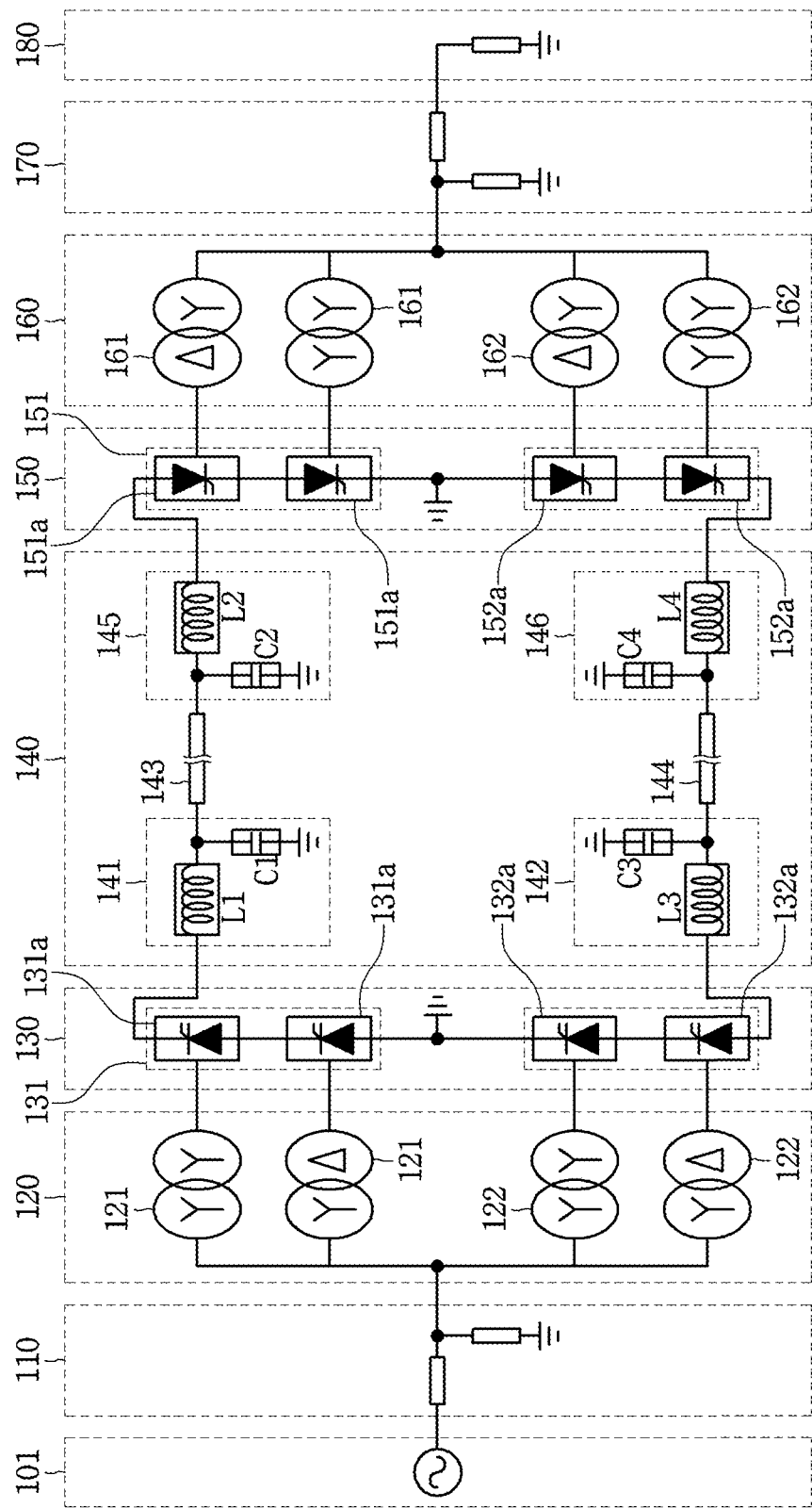
FIG. 3 is a view illustrating the configuration of a bipolar-type high voltage direct current (HVDC) transmission system according to an embodiment.

FIG. 3 illustrates a bipolar type HVDC transmission system according to an embodiment.

Particularly, FIG. 3 illustrates a system which transmits DC power with two poles. Hereinafter, the two poles are described assuming a positive pole and a negative pole, but are not necessarily limited thereto.

The transmission side AC part 110 includes an AC transmission line 111 and an AC filter 113.

The AC power transmission line 111 transfers the three-phase AC power generated by the generation part 101, to the transmission side power transformation part 103.

The AC filter 113 removes frequency components other than the frequency component used by the power transformation part 103 from the transferred three-phase AC power.

The transmission side transformer part 120 includes one or more transformers 121 for the positive pole, and one or more transformers 122 for the negative pole. The transmission side AC-DC converter part 130 includes an AC-positive pole DC converter 131 which generates positive pole DC power and an AC-negative pole DC converter 132 which generates negative pole DC power. The AC-positive pole DC converter 131 includes one or more three-phase valve bridges 131a respectively corresponding to the one or more transformers 121 for the positive pole. The AC-negative pole DC converter 132 includes one or more three-phase valve bridges 132a respectively corresponding to the one or more transformers 122 for the negative pole.

When one three-phase valve bridge 131a is used for the positive pole, the AC-positive pole DC converter 131 may generate positive pole DC power having six pulses by using the AC power. Here, a primary coil and a secondary coil of one of the transformers 121 may have a Y-Y connection or a Y-delta (Δ) connection.

When two three-phase valve bridges 131a are used for the positive pole, the AC-positive pole DC converter 131 may generate positive pole DC power having 12 pulses by using the AC power. Here, a primary coil and a secondary coil of one of the two transformers 121 may have a Y-Y connection, and a primary coil and a secondary coil of the other of the two transformers 121 may have a Y-Δ connection.

When three three-phase valve bridges 131a are used for the positive pole, the AC-positive pole DC converter 131 may generate positive pole DC power having 18 pulses by using the AC power. The more the number of pulses of the positive pole DC power becomes, the lower the price of the filter becomes.

When one three-phase valve bridge 132a is used for the negative pole, the AC-negative pole DC converter 132 may generate negative pole DC power having six pulses. Here, a primary coil and a secondary coil of one of the transformers 122 may have a Y-Y connection or a Y-delta (Δ) connection.

When two three-phase valve bridges 132a are used for the negative pole, the AC-negative pole DC converter 132 may generate negative pole DC power having 12 pulses. Here, a primary coil and a secondary coil of one of the two transformers 122 may have a Y-Y connection, and a primary coil and a secondary coil of the other of the two transformers 122 may have a Y-Δ connection.

When three three-phase valve bridges 132a are used for the negative pole, the AC-negative pole DC converter 132 may generate negative pole DC power having 18 pulses. The more the number of the pulses of the negative pole DC power becomes, the lower the price of the filter becomes.

The DC power transmission part 140 includes a transmission side positive pole DC filter 141, a transmission side negative pole DC filter 142, a positive pole DC power transmission line 143, a negative pole DC power transmission line 144, a customer side positive pole DC filter 145, and a customer side negative pole DC filter 146.

The transmission side positive pole DC filter 141 includes an inductor L1 and a capacitor C1 and performs DC filtering on the positive pole DC power output by the AC-positive pole DC converter 131.

The transmission side negative pole DC filter 142 includes an inductor L3 and a capacitor C3 and performs DC filtering on the negative pole DC power output by the AC-negative pole DC converter 132.

The positive pole DC power transmission line 143 has a single DC line for transmission of the positive pole DC power, and the earth may be used as a current feedback path. One or more switches may be disposed on the DC line.

The negative pole DC power transmission line 144 has a single DC line for transmission of the negative pole DC power, and the earth may be used as a current feedback path. One or more switches may be disposed on the DC line.

The customer side positive pole DC filter 145 includes an inductor L2 and a capacitor C2 and performs DC filtering on the positive pole DC power transferred through the positive pole DC power transmission line 143.

The customer side negative pole DC filter 146 includes an inductor L4 and a capacitor C4 and performs DC filtering on the negative pole DC power transferred through the negative pole DC power transmission line 144.

The customer side DC-AC converter part 150 includes a positive pole DC-AC converter 151 and a negative pole DC-AC converter 152. The positive pole DC-AC converter 151 includes one or more three-phase valve bridges 151a and the negative pole DC-AC converter 152 includes one or more three-phase valve bridges 152a.

The customer side transformer part 160 includes, for the positive pole, one or more transformers 161 respectively corresponding to one or more three-phase valve bridges 151a, and for the negative pole, one or more transformers 162 respectively corresponding to one or more three-phase valve bridges 152a.

When one three-phase valve bridge 151a is used for the positive pole, the positive pole DC-AC converter 151 may generate AC power having six pulses by using the positive pole DC power. Here, a primary coil and a secondary coil of one of the transformers 161 may have a Y-Y connection or a Y-delta (Δ) connection.

When two three-phase valve bridges 151a are used for the positive pole, the positive pole DC-AC converter 151 may generate AC power having 12 pulses by using the positive pole DC power. Here, a primary coil and a secondary coil of one of the two transformers 161 may have a Y-Y connection, and a primary coil and a secondary coil of the other of the two transformers 161 may have a Y-Δ connection.

When three three-phase valve bridges 151a are used for the positive pole, the positive pole DC-AC converter 151 may generate AC power having 18 pulses by using the positive pole DC power. The more the number of the pulses of the AC power becomes, the lower the price of the filter becomes.

When one three-phase valve bridge 152a is used for the negative pole, the negative pole DC-AC converter 152 may generate AC power having six pulses by using the negative pole DC power. Here, a primary coil and a secondary coil of one of the transformers 162 may have a Y-Y connection or a Y-delta (Δ) connection.

When two three-phase valve bridges 152a are used for the negative pole, the negative pole DC-AC converter 152 may generate AC power having 12 pulses by using the negative pole DC power. Here, a primary coil and a secondary coil of one of the two transformers 162 may have a Y-Y connection, and a primary coil and a secondary coil of the other of the two transformers 162 may have a Y-Δ connection.

When three three-phase valve bridges 152a are used for the negative pole, the negative pole DC-AC converter 152 may generate AC power having 18 pulses by using the negative pole DC power. The more the number of the pulses of the AC power become, the lower the price of the filter becomes.

The customer side AC part 170 includes an AC filter 171 and an AC power transmission line 173.

The AC filter 171 removes frequency components other than the frequency component (for example, 60 Hz) used by the customer part 180 from the AC power generated by the customer side power transformation part 105.

The AC power transmission line 173 transfers the filtered AC power to the customer part 180.

Figure 4:
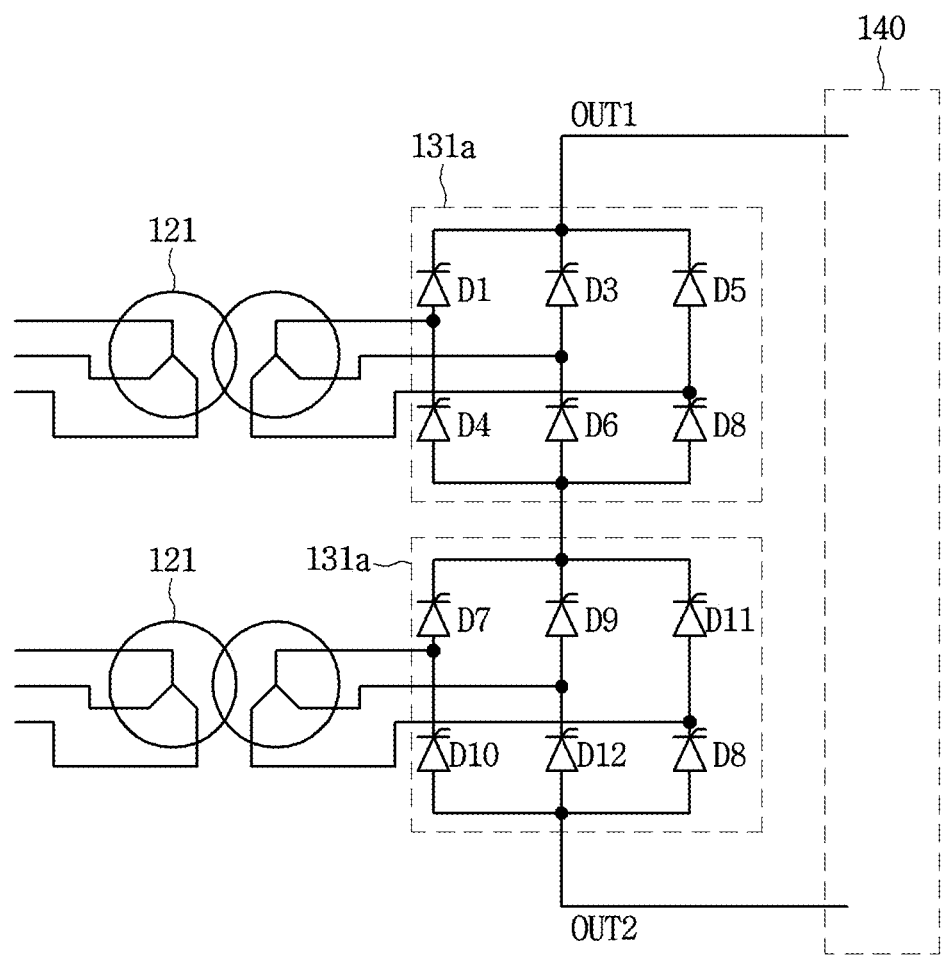
FIG. 4 is a view illustrating a connection between a transformer and a three-phase valve bridge according to an embodiment.

FIG. 4 illustrates a connection between a transformer and a three-phase valve bridge according to an embodiment.

Particularly, FIG. 4 illustrates the connection between the two transformers 121 for the positive pole and the two three-phase valve bridges 131a for the positive pole. Since the connection between the two transformers 122 for the negative pole and the two three-phase valve bridges 132a for the negative pole, the connection between the two transformers 161 for the positive pole and the two three-phase valve bridges 151a for the positive pole, the connection between the two transformers 162 for the negative pole and the two three-phase valve bridges 152a for the negative pole, the connection between the one transformer 121 for the positive pole and the one three-phase valve bridge 131a for the positive pole, the connection between the one transformer 161 for the positive pole and the one three-phase valve bridge 151a for the positive pole, etc., could be easily derived from the embodiment of FIG. 4, drawings and descriptions thereof will not be provided herein.

In FIG. 4, the transformer 121 having the Y-Y connection is referred to as an upper transformer, the transformer 121 having the Y-Δ connection is referred to as a lower transformer, the three-phase valve bridge 131a connected to the upper transformer is referred to as upper three-phase valve bridge, and the three-phase valve bridge 131a connected to the lower transformer is referred to as lower three-phase valve bridge.

The upper three-phase valve bridge and the lower three-phase valve bridge have two output terminals outputting DC power, i.e., a first output terminal OUT1 and a second output terminal OUT2.

The upper three-phase valve bridge includes six valves D1 to D6, and the lower three-phase valve bridges include six valves D7 to D12.

The valve D1 has a cathode connected to the first output terminal OUT1 and an anode connected to a first terminal of the secondary coil of the upper transformer.

The valve D2 has a cathode connected to the anode of the valve D5 and an anode connected to the anode of the valve D6.

The valve D3 has a cathode connected to the first output terminal OUT1 and an anode connected to a second terminal of the secondary coil of the upper transformer.

The valve D4 has a cathode connected to the anode of the valve D1 and an anode connected to the anode of the valve D6.

The valve D5 has a cathode connected to the first output terminal OUT1 and an anode connected to a third terminal of the secondary coil of the upper transformer.

The valve D6 has a cathode connected to the anode of the valve D3.

The valve D7 has a cathode connected to the anode of the valve D6 and an anode connected to a first terminal of the secondary coil of the lower transformer.

The valve D8 has a cathode connected to the anode of the valve D11 and an anode connected to a second output terminal OUT2.

The valve D9 has a cathode connected to the anode of the valve D6 and an anode connected to a second terminal of the secondary coil of the lower transformer.

The valve D10 has a cathode connected to the anode of the valve D7 and an anode connected to the second output terminal OUT2.

The valve D11 has a cathode connected to the anode of the valve D6 and an anode connected to a third terminal of the secondary coil of the lower transformer.

The valve D12 has a cathode connected to the anode of the valve D9 and an anode connected to the second output terminal OUT2.

Meanwhile, the customer side DC-AC converter part 150 may be configured as a modular multi-level converter 200.

The modular multi-level converter 200 may convert DC power into AC power by using a plurality of sub-modules 210.

Figure 5:
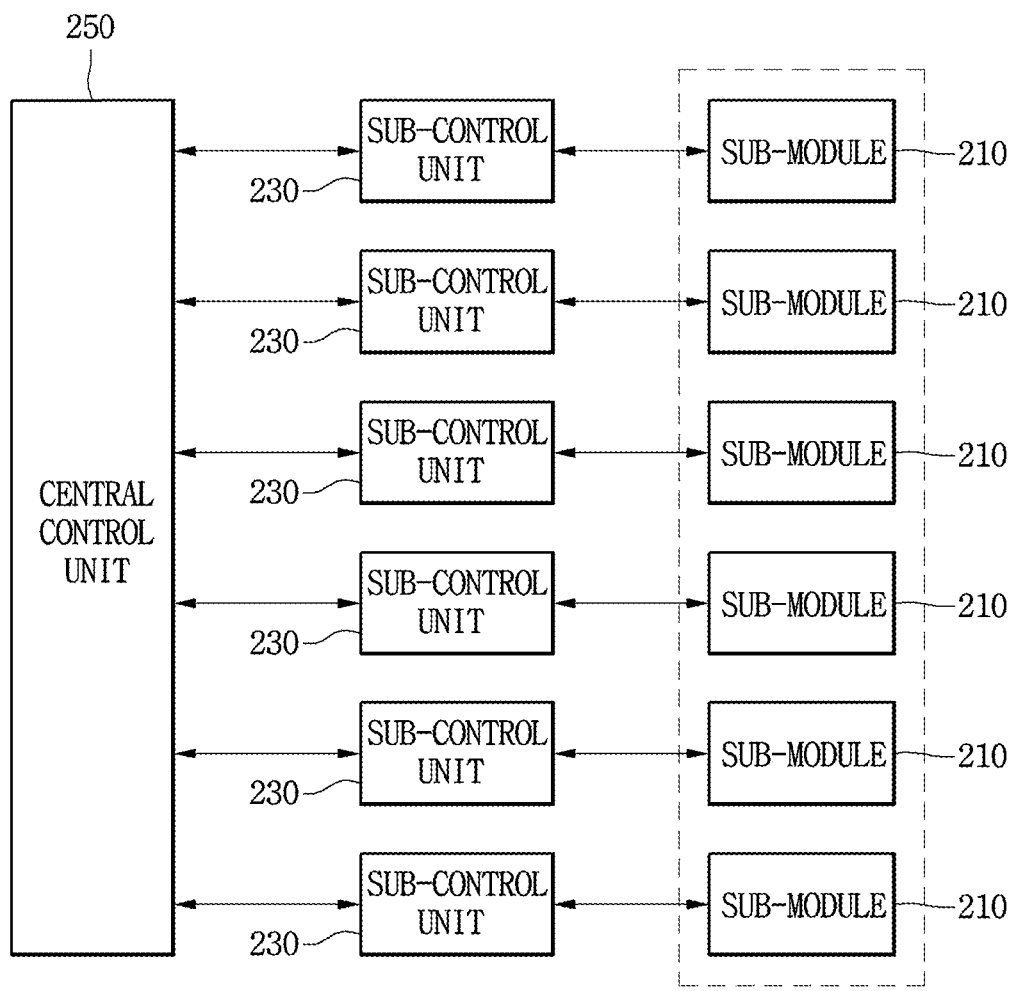
FIG. 5 is a block diagram illustrating a modular multi-level converter according to an embodiment.
Figure 6:
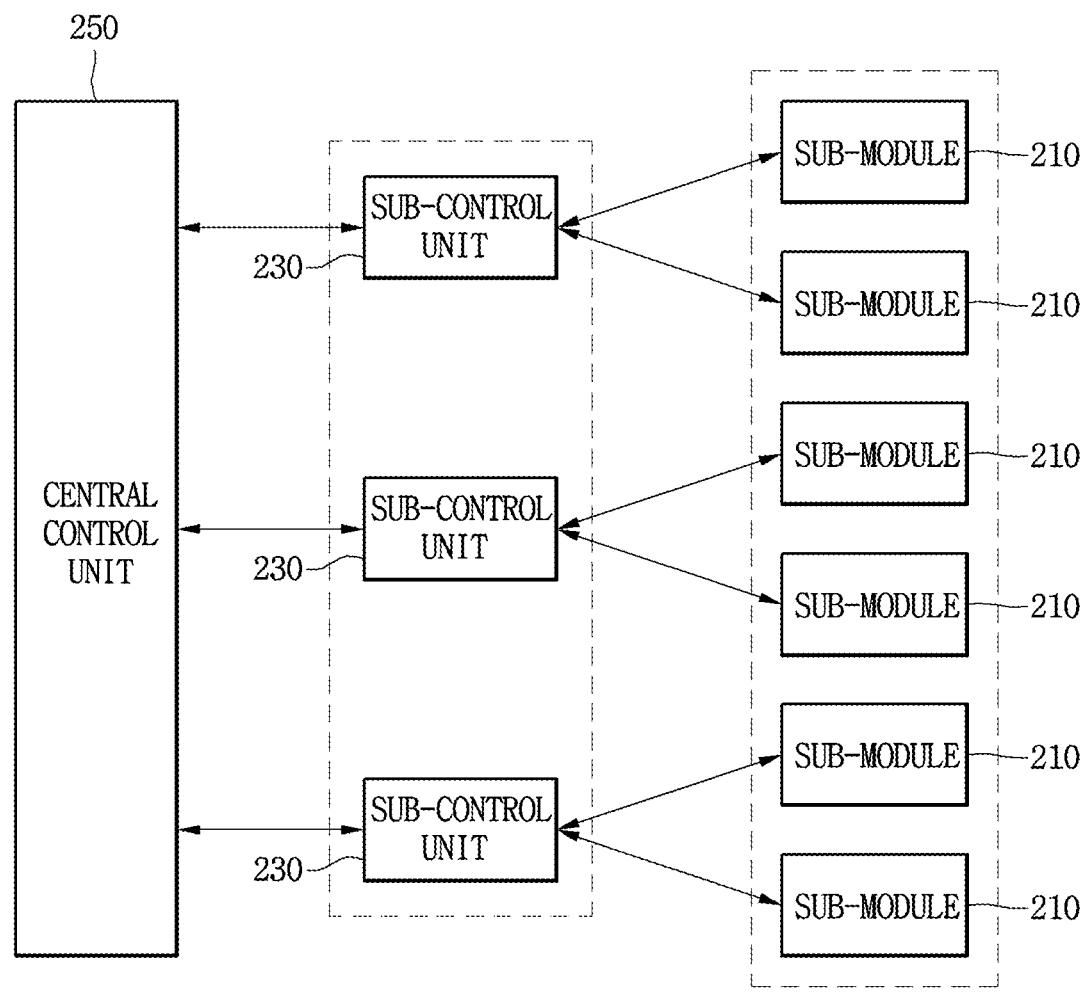
FIG. 6 is a block diagram illustrating a modular multi-level converter according to another embodiment.

Referring to FIGS. 5 and 6, the configuration of the modular multi-level converter 200 will be described.

FIGS. 5 and 6 are block diagrams illustrating a modular multi-level converter 200.

The modular multi-level converter 200 includes a central control unit 250, a plurality of sub-control units 230 and a plurality of sub-modules 210.

The central control unit 250 controls the plurality of sub-control units 230, and the sub-control units 230 may respectively control the sub-modules 210 connected thereto.

Here, as illustrated in FIG. 5, one sub-control unit 230 is connected to one sub-module 210, and accordingly, may control the switching operation of the one sub-module 210 connected thereto based on a control signal transferred through the central control unit 250.

Also, alternatively, as shown in FIG. 6, one sub-control unit 230 is connected to a plurality of sub-modules 210, and accordingly, may confirm each of the control signals for the plurality of sub-modules 210 connected thereto based on a plurality of control signals transferred through the central control unit 250; each of the plurality of sub-modules 210 may be controlled based on the confirmed control signal.

The central control unit 250 determines the operation condition of the plurality of sub-modules 210, and generates a control signal to control the operation of the plurality of sub-modules 210 according to the determined operation condition.

The operation condition may include a discharging operation, a charging operation, and a bypassing operation.

Here, different addresses are assigned to the plurality of sub-modules 210, respectively.

Preferably, the addresses, which sequentially increase from the front according to the arranged sequence of the sub-modules, are assigned to the plurality of sub-modules 210, respectively.

That is, the sub-module 210 may perform any one of the discharging operation, the charging operation, and the bypassing operation after receiving DC power.

The sub-module 210 includes a switching element having a diode, and accordingly, may perform any one of the discharging operation, the charging operation, and the bypassing operation of the sub-module 210 by a switching operation and the rectifying operation of the diode.

Each of the sub-control unit 230 receives a switching signal for controlling the plurality of sub-modules 210 through the central control unit 250, and controls the switching operation of the sub-module 210 according to the received switching signal.

That is, the central control unit 250 may control the overall operations of the modular multi-level converter 200.

The central control unit 250 may measure the current and voltage of the AC parts 110 and 170 and Dc power transmission part 140, which are interconnected thereto.

Also, the central control unit 250 may calculate an overall control value.

Here, the overall control value may be a target value for the voltage, current, frequency of the output AC power of the modular multi-level converter 200.

The central control unit 250 may calculate an overall control value based on one or more of the current and the voltage of the AC parts 110 and 170 which are interconnected with the modular multi-level converter 200 and the current and the voltage of the DC power transmission part 140.

Meanwhile, the central control unit 250 may also control the operation of the modular multi-level converter 200 based on one or more from the reference active power, the reference reactive power, the reference current, the reference voltage received from an upper layer control unit (not shown) through a communications apparatus (not shown).

The central control unit 250 may transmit and receive data to/from the sub-control unit 230.

Here, the central control unit 250 described herein assigns addresses according to the arranged sequence of the plurality of sub-modules 210, and determines the switching sequence of the plurality of sub-modules 210 by using the assigned addresses.

That is, in general, all the sub-modules 210 do not operate under the same switching conditions, but a certain sub-module performs a charging operation or a bypassing operation according to the present required voltage, and the remaining sub-modules perform a discharging operation.

Accordingly, the central control unit 250 should firstly determine the sub-module which will perform the discharging operation.

Here, as the discharging operation is performed, the service life of the plurality of sub-modules 210 may be increased only if the plurality of sub-modules 210 perform the discharging operations within balanced frequencies with each other.

In other words, when a discharging operation frequency of a certain sub-module is high, the service life of the sub-module is turned out to be lower than that of other sub-modules having a low discharging operation frequencies.

Accordingly, it is very important to more rapidly determine the switching conditions of the plurality of sub-modules 210 while the balance of the switching frequencies of the plurality of sub-modules 210 is maintained.

Thus, in the embodiments, the switching sequence of the plurality of sub-modules 210 is determined according to the sequence of the addresses which are sequentially assigned.

For example, when there are sub-modules which are assigned with addresses 1 to 5 respectively, the central control unit 250 allows the discharging operations to be performed from the address 1. Here, the number of the sub-modules, in which the discharging operations are performed, is determined on the basis of a charged voltage value and a target value of each of the plurality of sub-modules.

That is, the central control unit 250 determines the switching conditions such that the sum of the charged voltage values of the plurality of sub-modules reach the target value. In other words, if power corresponding to the target value may be output by discharging even when the sub-modules assigned with address 1 and 2 are discharged, the central control unit 250 allows only the sub-modules assigned with addresses 1 and 2 to perform the discharging operations.

In addition, when determining the next switching condition, the central control unit 250 determines that a discharge operation is performed starting from a sub-module next to the sub-module having the latest address among the sub-modules previously performing discharging operations.

This will be described below in more detail.

Figure 7:
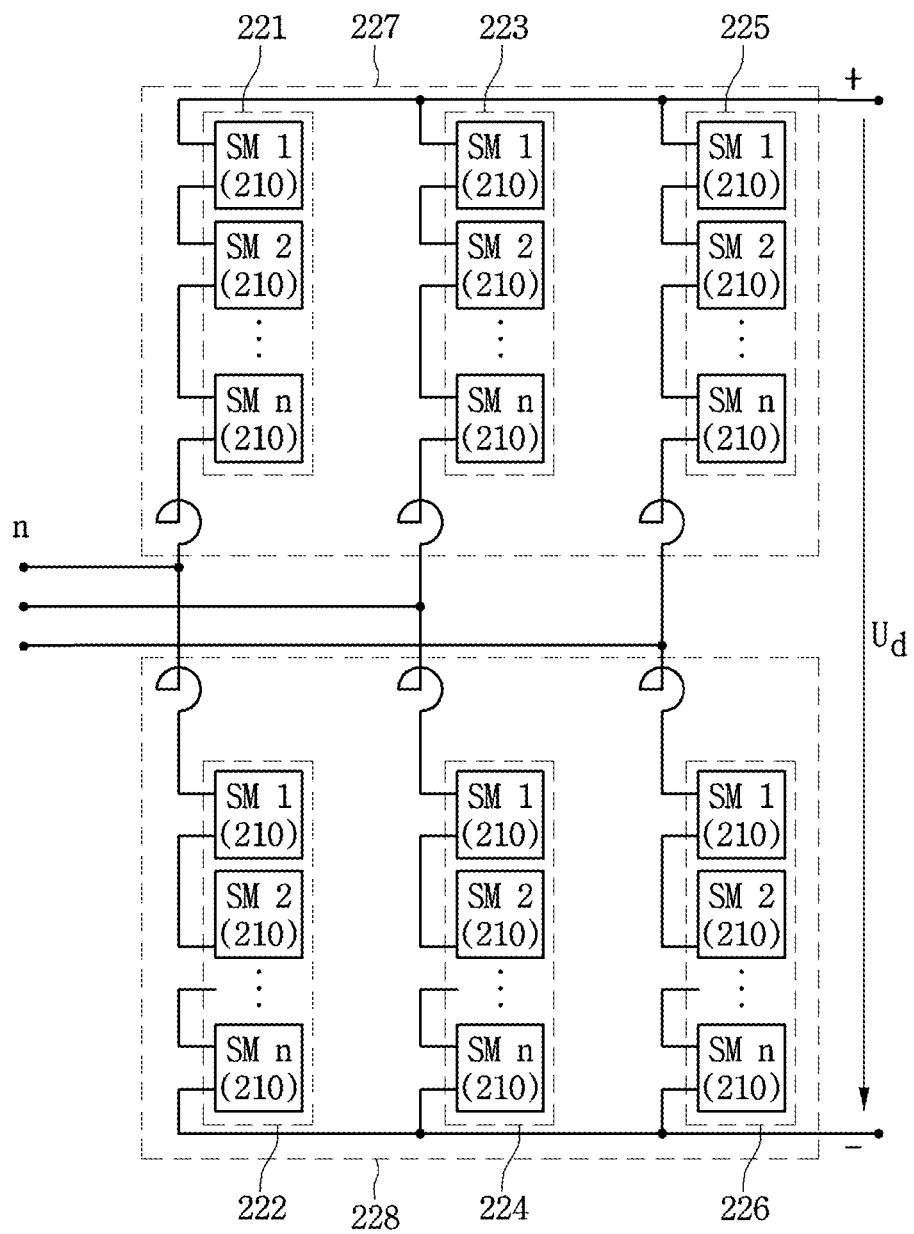
FIG. 7 illustrates connections of a plurality of sub-modules according to an embodiment.

Referring to FIG. 7, description will be given of connections of the plurality of sub-modules 210 included in the modular multi-level converter 200.

FIG. 7 illustrates connections of the plurality of sub-modules 210 included in the modular multi-level converter 200.

Referring to FIG. 7, the plurality of sub-modules 210 may be serially connected, and the plurality of sub-modules 210 connected to a positive pole or negative pole of one phase may constitute one arm.

The three-phase modular multi-level converter 200 may normally include six arms, and include a positive pole and a negative pole for each of the three-phases A, B, and C to form the six arms.

Accordingly, the three-phase modular multi-level converter 200 may include: a first arm 221 including a plurality of sub-modules for a positive pole of phase A; a second arm 222 including a plurality of sub-modules for a negative pole of phase A; a third arm 223 including a plurality of sub-modules for a positive pole of phase B; a fourth arm 224 including a plurality of sub-modules for a negative pole of phase B; a fifth arm 225 including a plurality of sub-modules for a positive pole of phase C; and a sixth arm 226 including a plurality of sub-modules for a negative pole of phase C.

Also, the plurality of sub-modules 210 for one phase may constitute a leg.

Accordingly, the three-phase modular multi-level converter 200 may include a phase A leg 227 including a plurality of sub-modules 210 for phase A; a phase B leg 228 including a plurality of sub-modules 210 for phase B; and a phase C leg 229 including a plurality of sub-modules 210 for phase C.

Therefore, the first to six arms 221 to 226 are respectively included in the phase A leg 227, the phase B leg 228, and phase C leg 229.

Specifically, in the phase A leg 227, the first arm 221, which is the positive pole arm of phase A, and the second arm 222, which is the negative pole arm of phase A, are included; and in the phase B leg 228, the third arm 223, which is the positive pole arm of phase B, and the fourth arm 224, which is the negative pole arm of phase B, are included. Also, in the phase C leg 229, the fifth arm 225, which is the positive pole arm of phase C, and the sixth arm 226, which is the negative pole arm of phase C, are included Also, the plurality of sub-modules 210 may constitute a positive pole arm 227 and a negative pole arm 228 according to polarity.

Specifically, referring to FIG. 7, the plurality of sub-modules 210 included in the modular multi-level converter 200 may be classified, with respect to a neutral line n, into a plurality of sub-modules 210 corresponding to the positive pole and a plurality of sub-modules 210 corresponding to the negative pole.

Thus, the modular multi-level converter 200 may include a positive arm 227 including the plurality of sub-modules 210 corresponding to the positive pole, and a negative arm 228 including the plurality of sub-modules 210 corresponding to the negative pole.

Accordingly, the positive pole arm 227 may include the first arm 221, the third arm 223, and the fifth arm 225; and the negative pole arm 228 may include the second arm 222, the fourth arm 224, and the sixth arm 226.

Figure 8:
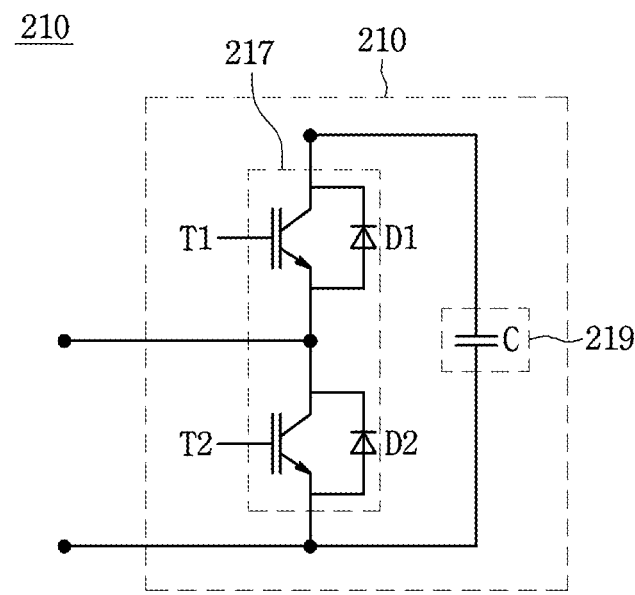
FIG. 8 is an exemplary view illustrating a configuration of a sub-module according to an embodiment.

Next, referring to FIG. 8, the configuration of the sub-module 210 is described.

FIG. 8 is an exemplary view illustrating a configuration of the sub-module 210.

Referring to FIG. 8, the sub-module 210 includes two switches, two diodes, and a capacitor. Such a shape of the sub-module 210 is also referred to as a half-bridge shape or a half bridge inverter.

In addition, the switch included in a switching part 217 may include a power semiconductor.

Here, the power semiconductor refers to a semiconductor element for a power apparatus, and may be optimized for the conversion or control of electric power. Also, the power semiconductor is referred to as a valve unit.

Accordingly, the switch included in the switching part 217 may include a power semiconductor, for example, may include an insulated gate bipolar transistor (IGBT), a gate turn-off thyristor, an integrated gate commutated thyristor, etc.

The storage part 219 includes the capacitor, and thus may charge or discharge energy. Meanwhile, the sub-module 210 may be represented as an equivalent model based on the configuration and the operation of the sub-module 210.

Figure 9:
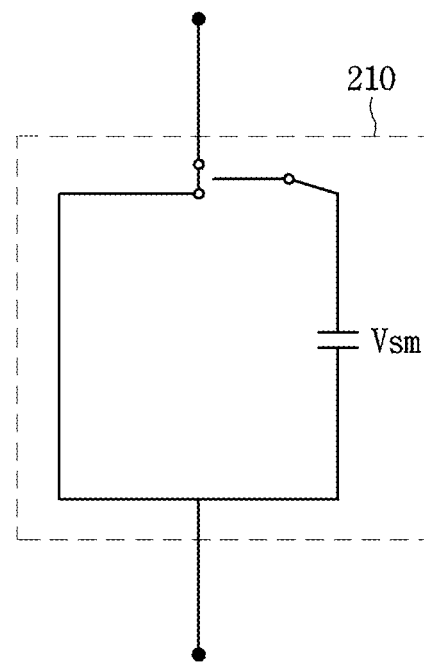
FIG. 9 illustrates an equivalent model of a sub-module according to an embodiment.

FIG. 9 illustrates an equivalent model of the sub-module 210, and referring to FIG. 9, the sub-module 210 may be illustrated as an energy charge and discharge unit including a switch and a capacitor.

Accordingly, it may be turned out that the sub-module 210 is the same as an energy charge and discharge unit having an output voltage of Vsm.

Next, referring to FIGS. 10 to 13, the operation of the sub-module 210 will be described.

The switch part 217 of the sub-module 210 of FIGS. 10 to 13 includes a plurality of switches T1 and T2, and each of the switches is connected to each of diodes D1 and D2. Also, the storage part 219 of the sub-module 210 includes a capacitor.

Figure 10:
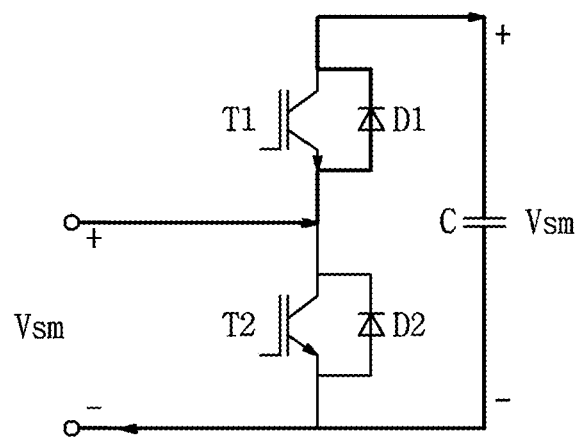
FIGS. 10 to 13 illustrate an operation of a sub-module according to an embodiment.
Figure 11:
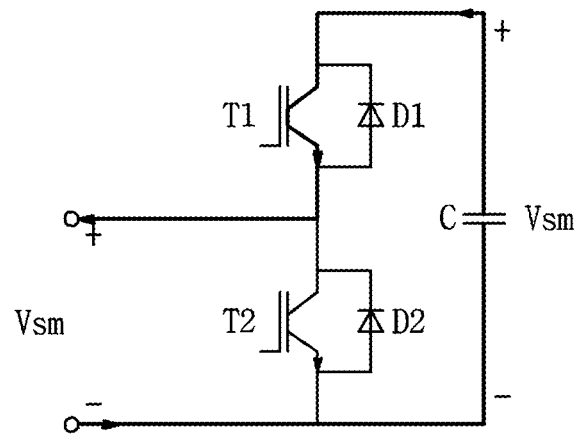

Referring to FIGS. 10 and 11, the charging and discharging operations of the sub-module 210 will be described.

FIGS. 10 and 11 illustrate formation of the capacitor voltage Vsm of the sub-module 210.

FIGS. 10 and 11 illustrate a state in which the switch T1 of the switching part 217 is turned on and the switch T2 is turned off. Accordingly, the sub-module 210 may form the capacitor voltage according to each of the switching operations.

Specifically, referring to FIG. 10, the current introduced into the sub-module 210 is transferred to the capacitor via the diode D1 and thus forms the capacitor voltage. Then, the formed capacitor voltage may charge energy into the capacitor.

Also, the sub-module 210 may perform discharging operation of discharging the charged energy.

Specifically, referring to FIG. 11, the stored energy of the capacitor, which is energy charged into the sub-module 210, is discharged via the switch T1. Accordingly, the sub-module 210 may discharge the stored energy.

Figure 12:
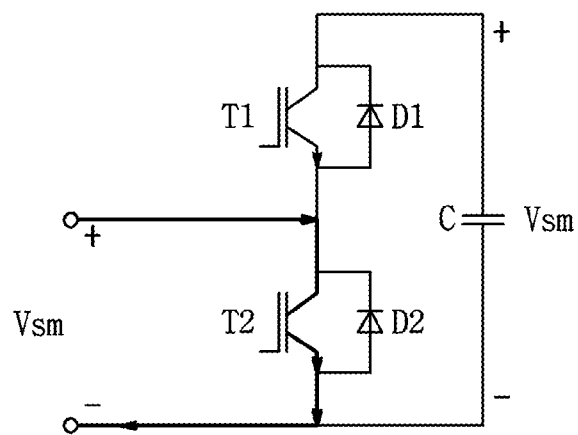
Figure 13:
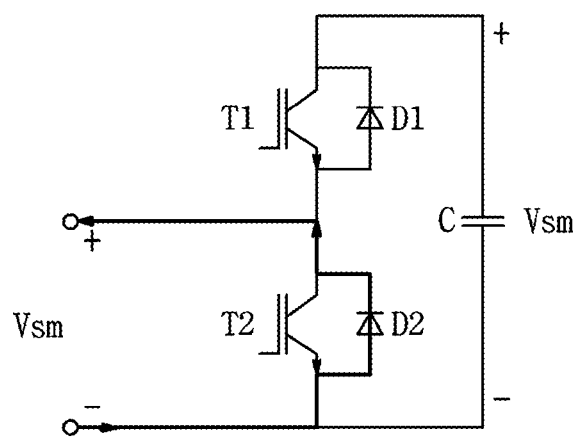

Referring to FIGS. 12 and 13, the bypassing operation of the sub-module 210 will be described.

FIGS. 12 and 13 illustrate the formation of a zero voltage of the sub-module 210.

FIGS. 12 and 13 illustrate a state in which the switch T1 of the switching part 217 is turned off and the switch T2 is turned-on. Accordingly, current does not flow to the capacitor of the sub-module 210, and the sub-module 210 may form a zero voltage.

Specifically, referring to FIG. 12, the current introduced into the sub-module 210 is output through the switch T2 and the sub-module may form a zero voltage.

Also, referring to FIG. 13, the current introduced into the sub-module 210 is output through the diode D2 and the sub-module 210 may form a zero voltage.

In this way, the sub-module 210 may form the zero voltage, and thus perform the bypassing operation in which the current does not flow into the sub-module 210 but bypasses the sub-module 210.

Figure 14:
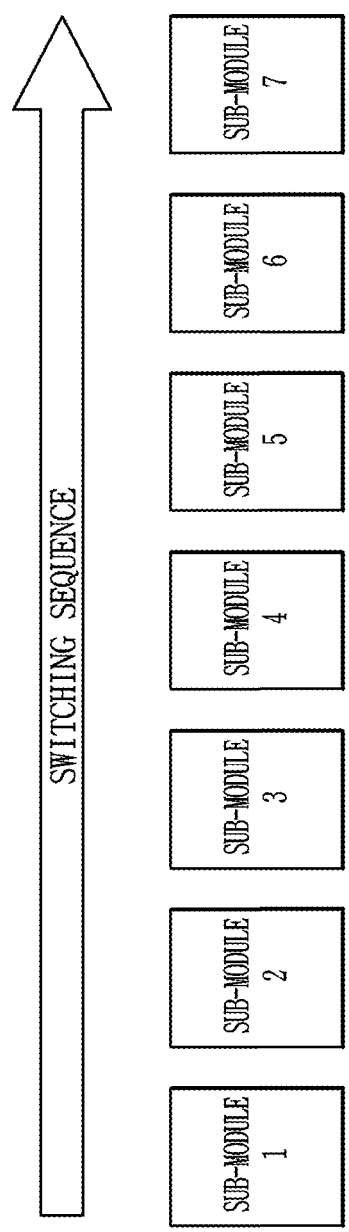
FIGS. 14 to 16 are views illustrating an operation of determining a switching sequence of a modular multi-level converter according to an embodiment.
Figure 15:
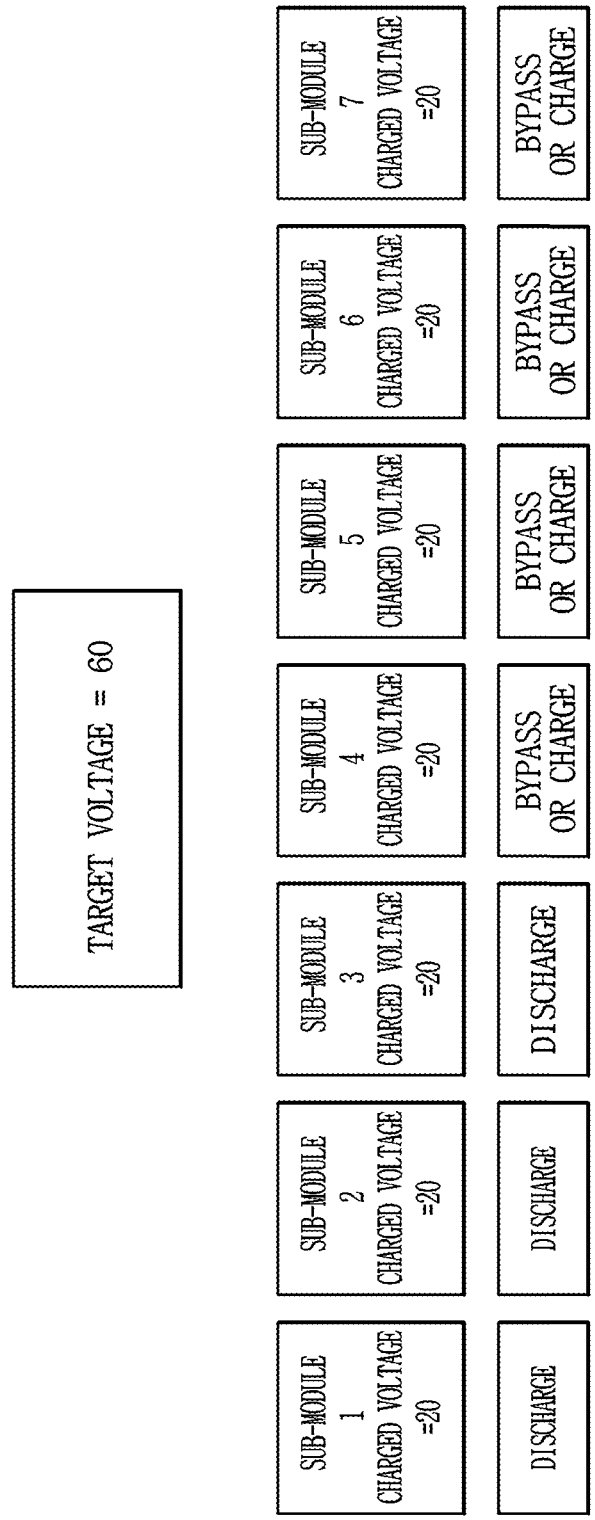
Figure 16:
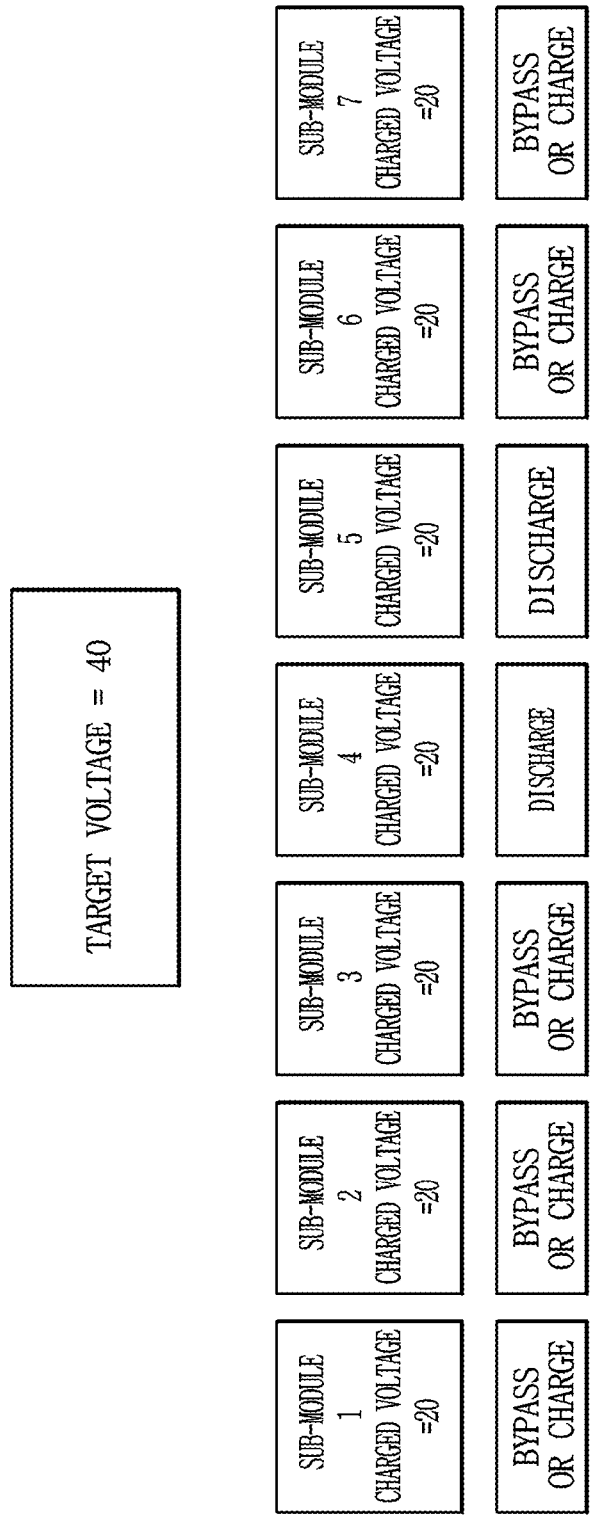

FIGS. 14 to 16 are views illustrating an operation of determining a switching sequence of a modular multi-level converter according to an embodiment.

Referring to FIG. 14, when the plurality of sub-modules 210 include a sub-module 1, a sub-module 2, a sub-module 3, a sub-module 4, a sub-module 5, a sub-module 6, and a sub-module 7, the central control unit 250 sequentially assigns addresses from the sub-module 1.

That is, address 1 may be assigned to the sub-module 1, address 2 may be assigned to the sub-module 2, address 3 may be assigned to the sub-module 3, address 4 may be assigned to the sub-module 4, address 5 may be assigned to the sub-module 5, address 6 may be assigned to the sub-module 6, and address 7 may be assigned to the sub-module 7.

Also, the central control unit 250 sequentially determines the switching sequence from the address 1. Here, the switching sequence is determined based on the charged voltage, which each of the sub-modules has, and a target voltage.

Referring to FIG. 15, when the target voltage is 60, and voltages of about 20 are identically charged into the sub-modules 1 to 7, the central control unit 250 determines the switching sequence of the sub-modules to meet the target voltage.

Here, since the voltage of about 20 is charged in each of the sub-modules, it is enough that only the three sub-modules from the front perform the discharging operations to meet the target voltage.

Accordingly, the central control unit 250 allows, according to the address sequence, only the sub-module 1, the sub-module 2, and the sub-module 3 to perform the discharging operations, and allows the remaining sub-modules to perform the bypassing operation or charging operation.

Here, when the above-mentioned switching condition is determined, the central control unit 250 remembers the sub-module which has the latest address among the sub-modules performing the discharging operations.

Also, referring to FIG. 16, when determining the next switching condition, the switching sequence is determined from the address next to the address of the remembered sub-module.

That is, since the discharging operations have been performed up to the sub-module 3, the discharging operation will be performed from the sub-module 4 at the next switching.

Accordingly, when the target voltage is 40, only the two sub-modules from the sub-module next to the remembered sub-module are allowed to perform the discharging operations.

Accordingly, the central control unit 250 allows only the sub-module 4, and the sub-module 5 to perform the discharging operations, and allows the remaining sub-modules to perform the bypassing operation or charging operation. Also, as described above, the central control unit 250 remembers information regarding the sub-module 5 which is assigned with the latest address among the sub-modules performing the discharging operations, and applies the remembered information when determining the switching condition later.

According to an embodiment, the switching sequence of the plurality of sub-modules is determined according to the assigned addresses, so that the time required to determine the operation condition of the sub-modules may be reduced.

Also, according to an embodiment, a plurality of sub-modules are switched according to the address sequence to maintain a balance of the switching frequencies of the plurality of sub-modules, so that a situation in which only a certain sub-module is continuously switched may be prevented in advance, and a situation in which the service life of the certain sub-module is reduced may also be prevented.

Figure 17:
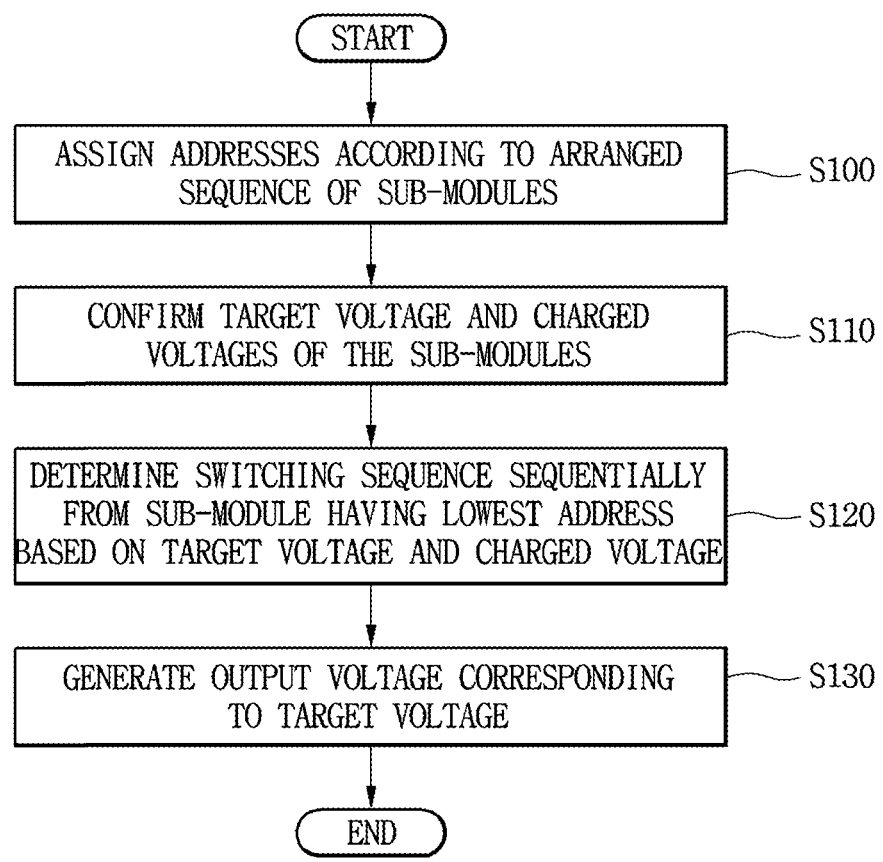
FIGS. 17 to 18 are flowcharts illustrating, step by step, a method of determining a switching sequence of a modular multi-level converter according to an embodiment.
Figure 18:
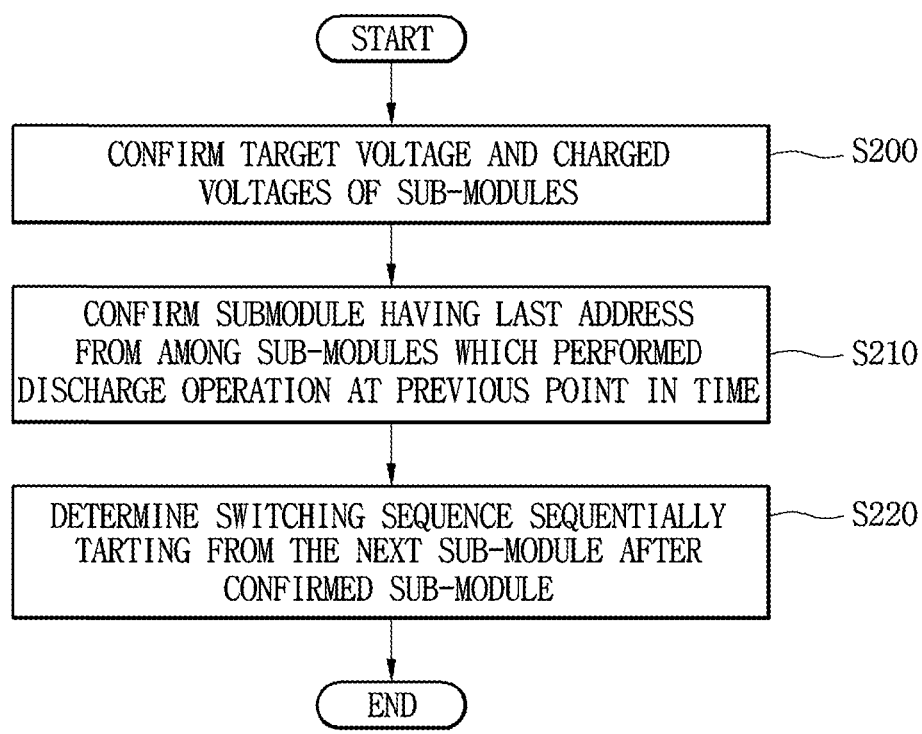

FIGS. 17 and 18 are flowcharts illustrating, step by step, a method of determining a switching sequence of a modular multi-level converter according to an embodiment.

First, referring to FIG. 17, the central control unit 250 assigns addresses according to the arranged sequence of the sub-modules (operation S100). That is, the lowest address is assigned to the frontmost one of the sub-modules, and the highest address is assigned to the sub-module which is disposed at the last.

Next, the central control unit 250 confirms a target voltage and the charged voltages of the plurality of sub-modules (operation S110).

Next, the central control unit 250 sequentially determines a switching sequence from the sub-module having the lowest address based on the target voltage and the charged voltages (operation S120).

That is, discharging operations are performed from the sub-module having the lowest address so that the target voltage may be output based on the charged voltages (operation S130).

Next, the output voltage corresponding to the target voltage is generated through the sequential discharging operations (operation S130).

Here, the central control unit 250 remembers the information on the sub-module which is assigned with the last address among the sub-modules performing the discharging operations, and later, determines the switching conditions of the sub-modules using the remembered information.

That is, referring to FIG. 18, the central control unit 250 confirms the target voltage and the charged voltages of the sub-modules (operation S200).

Next, the central control unit 250 confirms the sub-module which has the last address among the sub-modules which performed discharging operations at the previous time (operation S210).

Next, the central control unit 250 determines a switching sequence to output the target voltage from the sub-module having the address next to the confirmed sub-module (operation S220).

For example, when discharging operations were performed at the previous time up to the sub-module having address 3, discharging operations are performed from the sub-module having address 4 at the current time.

Next, as the discharging operations of the sub-modules are performed according to the determined switching sequence, the output voltage corresponding to the target voltage is generated (operation S230).

According to an embodiment, the switching sequence of the plurality of sub-modules is determined according to the assigned addresses, so that the time required to determine the operation condition of the sub-modules may be reduced.

Also, according to an embodiment, a plurality of sub-modules are switched according to the address sequence to maintain a balance of the switching frequencies of the plurality of sub-modules, so that a situation in which only a certain sub-module is continuously switched may be prevented in advance, and a situation in which the service life of the certain sub-module is reduced may also be prevented.

Furthermore, although preferred embodiments are illustrated and described above, the specification is not limited to a specific embodiment mentioned above. Various modifications are possible by those skilled in the art without departing from the spirit and scope of the claims. Also, such modifications should not be understood separately from the spirit and scope of the inventive concept.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A modular multi-level converter comprising:
a plurality of sub-modules comprising switching elements; and
a central control unit configured to:
sequentially assign an address to each of the plurality of sub-modules from the front according to an arranged sequence of the plurality of sub-modules for distinguishing each of the plurality of sub-modules,
determine switching operation conditions of the plurality of sub-modules based on the assigned addresses, and
output switching signals corresponding to the determined switching operation conditions,
wherein the switching operation conditions include a charging operation condition, a discharging operation condition, and a bypassing operation condition, and
wherein the central control unit is further configured to allow discharging operations to be performed sequentially from the sub-module having a lowest address based on a target voltage and charged voltages of the plurality of sub-modules; and
wherein the lowest address is assigned to the front most one of the plurality of sub-modules, and a highest address is assigned to the sub-module which is disposed at the rear most one of the plurality of sub-modules.

2. The modular multi-level converter according to claim 1,
wherein a sum of the voltages charged in sub-modules performing the discharging operations correspond to the target voltage, and
wherein the central control unit confirms the charged voltages from the sub-module having the lowest address and determines a switching operation condition of each of the sub-modules to generate an output voltage corresponding to the target voltage.

3. The modular multi-level converter according to claim 1, wherein when a sub-modules operating under the discharging operation condition are determined, the central control unit stores information on a sub-module having the last address from among the sub-modules operating under the discharging operation condition.

4. The modular multi-level converter according to claim 2, wherein the central control unit confirms a sub-module which has the last address and has performed a discharging operation at a previous point in time, and allows a discharging operation to be sequentially performed starting from a sub-module which has the next address after the address of the confirmed sub-module.

* * * * *